United States Patent
Nakamura et al.

(10) Patent No.: US 11,846,708 B2
(45) Date of Patent: Dec. 19, 2023

(54) OBJECT MONITORING SYSTEM INCLUDING DISTANCE MEASURING DEVICE

(71) Applicant: FANUC CORPORATION, Yamanashi (JP)

(72) Inventors: Minoru Nakamura, Yamanashi (JP); Yuuki Takahashi, Yamanashi (JP); Atsushi Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 817 days.

(21) Appl. No.: 16/546,299

(22) Filed: Aug. 21, 2019

(65) Prior Publication Data
US 2020/0088877 A1 Mar. 19, 2020

(30) Foreign Application Priority Data
Sep. 19, 2018 (JP) ................................ 2018-174806

(51) Int. Cl.
| | | |
|---|---|---|
| *G01S 17/36* | (2006.01) | |
| *G01S 7/35* | (2006.01) | |
| *G01S 7/497* | (2006.01) | |
| *G01S 17/48* | (2006.01) | |
| *G01S 17/88* | (2006.01) | |
| *G01S 7/4915* | (2020.01) | |
| *G01S 17/894* | (2020.01) | |

(52) U.S. Cl.
CPC .............. *G01S 17/36* (2013.01); *G01S 7/354* (2013.01); *G01S 7/497* (2013.01); *G01S 7/4915* (2013.01); *G01S 17/48* (2013.01); *G01S 17/88* (2013.01); *G01S 17/894* (2020.01)

(58) Field of Classification Search
CPC .......... G01S 17/36; G01S 7/354; G01S 7/497; G01S 17/88; G01S 17/894; G01S 7/4915; G01S 17/48
See application file for complete search history.

(56) References Cited

U.S. PATENT DOCUMENTS

| | | | |
|---|---|---|---|
| 2007/0237363 A1* | 10/2007 | Hagio | ...................... G01S 17/36 |
| | | | 382/106 |
| 2011/0246116 A1* | 10/2011 | Kamitani | .................. G01C 3/00 |
| | | | 702/159 |
| 2012/0033045 A1 | 2/2012 | Schweizer et al. | |
| 2015/0146010 A1* | 5/2015 | Yokozeki | .............. G01S 3/7864 |
| | | | 348/169 |

FOREIGN PATENT DOCUMENTS

| | | |
|---|---|---|
| DE | 102012103681 A1 | 10/2013 |
| JP | H8220220 A | 8/1996 |
| JP | 200980767 A | 4/2009 |
| JP | 2013143069 A | 7/2013 |

(Continued)

*Primary Examiner* — Bernarr E Gregory
*Assistant Examiner* — Ismaaeel A. Siddiquee
(74) *Attorney, Agent, or Firm* — HAUPTMAN HAM, LLP

(57) ABSTRACT

An object monitoring system includes means for determining an arrangement relationship between a monitoring area and an external object on a basis of a distance measurement value of the external object, and calculating an influence degree of the external object on an object distance measurement in the monitoring area in accordance with the determined arrangement relationship.

7 Claims, 10 Drawing Sheets

(56) References Cited

FOREIGN PATENT DOCUMENTS

| | | | | |
|---|---|---|---|---|
| JP | 2015-513825 A | 5/2015 | | |
| JP | 201715448 A | 1/2017 | | |
| JP | WO2014/097539 A1 | 1/2017 | | |
| JP | 201778707 A | 4/2017 | | |
| JP | 2018155725 A | * 10/2018 | ............ | G01S 13/36 |
| WO | 2018091970 A1 | 5/2018 | | |

* cited by examiner

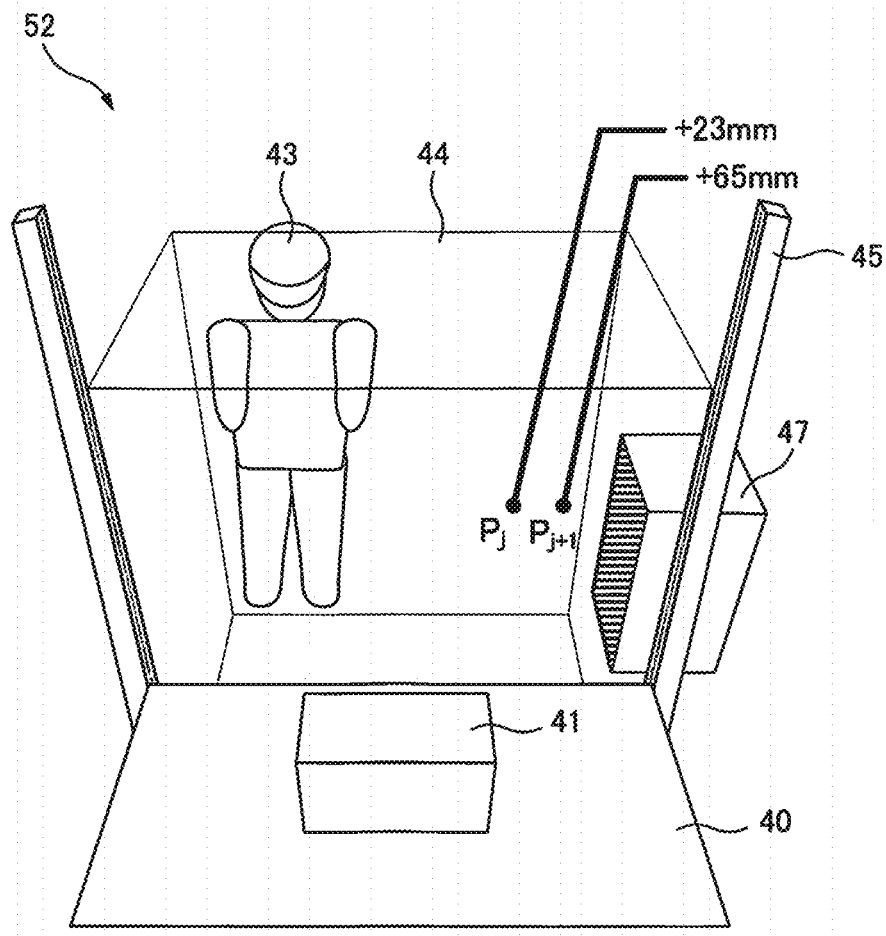

OBJECT MONITORING SYSTEM INCLUDING DISTANCE MEASURING DEVICE

RELATED APPLICATIONS

The present application claims priority of Japanese Application Number 2018-174806, filed Sep. 19, 2018, the disclosure of which is hereby incorporated by reference herein in its entirety.

BACKGROUND OF THE INVENTION

1. Field of the Invention

The present invention relates to an object monitoring system including a distance measuring device, and in particular, relates to an object monitoring system for detecting the influence of external objects outside of a monitoring area.

2. Description of Related Art

TOF (time of flight) cameras which output a distance on a basis of the time of flight of light as distance measuring devices for measuring the distance to an object are known. Many TOF cameras use a phase difference method in which a target space is irradiated with reference light which is intensity-modulated over predetermined cycles, and the measurement value of the target space is output based on a phase difference between the irradiated measurement light and the light reflected from the target space.

Since such TOF cameras measure distance by indirect measurement of the path lengths of reference light on a basis of the phase difference, the phenomenon (so-called "multipath") wherein distance measurement values are erroneously large when certain distance measurement points are strongly influenced by reference light which has been multi-reflected via other objects is known. The following Patent Documents are known as technologies related to the suppression or reduction of the influence of multipath.

Re-publication of PCT International Publication (Sai-Kohyo) No. 2014/097539 discloses a three-dimensional measurement device comprising a light source unit which is configured so as to be capable of adjusting the irradiation light amount for at least two irradiation areas. The three-dimensional measurement device takes the difference between the sum of the exposure amount of an irradiation pattern A, in which a predetermined baseline light amount is set as the irradiation light amount in each of irradiation areas a, b, and c, and the sum of the exposure amount of an irradiation pattern B, in which the irradiation light amount of the irradiation area b, which is at least one of the irradiation areas, is smaller than the baseline light amount and doubles the difference to calculate exposure components of unwanted reflected light mixed in the irradiation pattern A.

Japanese Unexamined PCT Publication (Kohyo) No. 2015-513825 discloses a time of flight camera comprising an illumination module (stripe illumination) that illuminates only an arbitrary area in the field of view of the imaging sensor. The configuration that performs illumination and measurement independently for each pixel area can reduce indirect light paths and multi-reflection, and at the same time allows more direct light to be received by the pixel area, which is advantageous in terms of multi-reflection (multipath reflection).

SUMMARY OF THE INVENTION

In an object monitoring system in which it is determined, using a TOF camera, whether or not a monitored object is present in a set monitoring area in a target space on a basis of the distance measurement value, when there is an external object which causes the multipath phenomenon in the vicinity of the monitoring area, the distance measurement value output from the TOF camera can be accidentally large. In this case, particularly in distant positions in the monitoring area, it may be erroneously determined that the monitored object is absent even when the monitored object is present in the monitoring area.

Furthermore, even if the external object is not in the vicinity of the monitoring area at the time of installation of the object monitoring system, if an operator arranges the external object in the vicinity of the monitoring area after installation, the distance measurement value may become large and the determination may be erroneous. Thus, it is desirable that the presence or absence of an external object near the monitoring area be continuously checked not only at the time of installation but also after installation.

Even if the external object is present in the vicinity of the monitoring area, depending on the arrangement relationship between the monitoring area and the external object or the reflectivity of the external object, the external object may not exert a large influence on the object distance measurement in the monitoring area.

Thus, an object monitoring system which can recognize an influence degree of an external object on the object distance measurement in the monitoring area has been demanded.

An aspect of the present disclosure provides an object monitoring system comprising a distance measuring device which outputs a distance measurement value of a target space on a basis of a phase difference between reference light emitted toward the target space and reflected light reflected from the target space, for determining, based on the distance measurement value, whether or not a monitored object is present in a set monitoring area in the target space, the system comprising means for determining an arrangement relationship between the monitoring area and an external object outside the monitoring area on a basis of the distance measurement value of the external object, and calculating an influence degree of the external object on an object distance measurement in the monitoring area in accordance with the determined arrangement relationship.

BRIEF DESCRIPTION OF THE DRAWINGS

FIG. 12 is a view showing an example of a display screen showing an influence degree which is greater than or equal to a second threshold value and the external object imparting the influence degree which is greater than or equal to the second threshold value.

DETAILED DESCRIPTION

Figure 1:
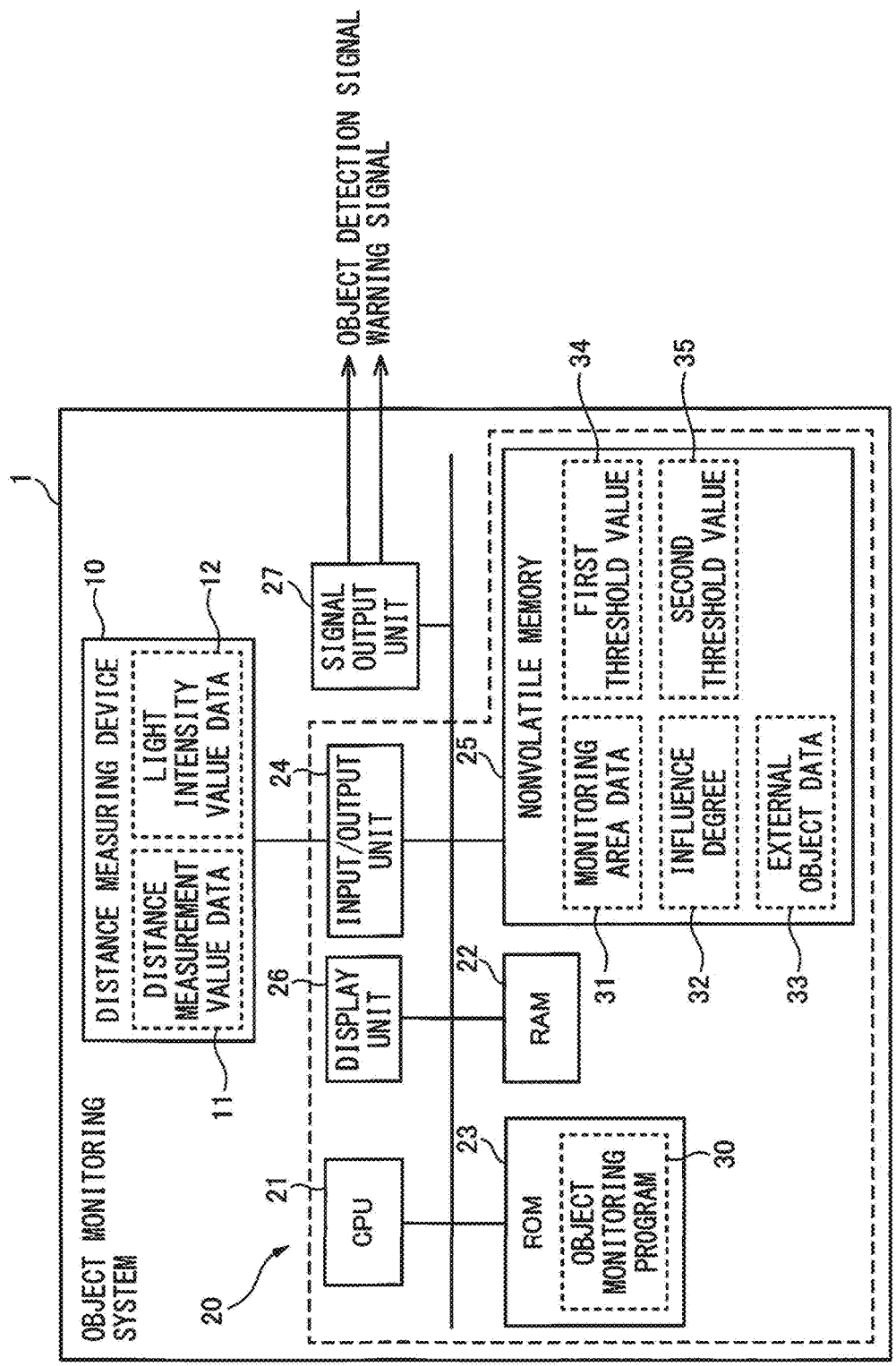
FIG. 1 is a block diagram showing the configuration of an object monitoring system according to an embodiment.

The embodiments of the present disclosure will be described in detail below with reference to the attached drawings. In the drawings, the same or similar constituent elements have been assigned the same or similar reference numerals. Furthermore, the embodiments described below do not limit the technical scope of the inventions described in the claims or the definitions of the terms.

FIG. 1 is a block diagram showing the configuration of an object monitoring system 1 according to an embodiment. The object monitoring system 1 comprises a distance measuring device 10, a computing device 20, and a signal output unit 27, and is configured to monitor the presence or absence of objects in a monitoring area. The distance measuring device 10, the computer device 20, and the signal output unit 27 are connected via a wired or wireless network, etc., and are configured so as to be capable of communicating with each other. In another embodiment, at least one of the distance measuring device 10, the signal output unit 27, and the computing device 20 may be connected by a bus connection. The signal output unit 27 has a function to output one or a plurality of signals to an external device, and may have one or a plurality of signal input functions in some cases. Ethernet®, or USB communication control may be used as the network communication control.

The distance measuring device 10 is, for example, a TOF camera, and outputs distance measurement value data 11 of the target space on a basis of the phase difference between reference light emitted toward the target space and light reflected from the target space. Further, the distance measuring device 10 may output light intensity value data 12 of the reference light reflected from the target space in some cases.

The computing device 20 comprises a CPU 21, RAM 22, ROM 23, an input/output unit 24, a nonvolatile memory 25, and a display unit 26. Monitoring area data 31 including three-dimensional information of the monitoring area is stored in the nonvolatile memory 25. When the CPU 21 executes the object monitoring program 30 stored in the ROM 23 using the RAM 22 as working RAM, the monitoring area data 31 is read from the nonvolatile memory 25, and the distance measurement value data 11 and light intensity value data 12, etc., are read from the distance measuring device 10 via the input/output unit 24. The CPU 21 determines the presence or absence of objects in the monitoring area on a basis of the distance measurement value data 11 and the monitoring area data 31, and when a monitored object is present in the monitoring area, an object detection signal is output using the signal output unit 27. Furthermore, the display unit 26 displays the distance measurement value data 11 or light intensity value data from the distance measuring device 10 as an image.

The object monitoring system 1 according to the present embodiment calculates the influence degree of the external object on the object distance measurement in the monitoring area. The CPU 21 determines the arrangement relationship between the monitoring area and the external object on a basis of the distance measurement value data 11 of the external object and the monitoring area data 31, and calculates the influence degree 32 of the external object on the object distance measurement in the monitoring area in accordance with the determined arrangement relationship. Furthermore, if necessary, the CPU 21 can calculate the influence degree 32 from the light intensity value data 12 of the external object in addition to the arrangement relationship. The influence degree 32 may be stored in the nonvolatile memory 25 in association with the external object data 33.

Furthermore, the object monitoring system 1 according to the present embodiment can detect whether or not the influence degree 32 exceeds a first threshold value 34. The first threshold value 34 is stored in the nonvolatile memory 25. When an influence degree 32 which is equal to or greater than the first threshold value 34 is detected, the CPU 21 outputs a warning signal using the signal output unit 27. By outputting a warning signal from the object monitoring system 1, for example, the operator who arranged the object compromising the determination of the monitored object in the monitoring area can recognize the potential of the occurrence of an erroneous determination, and can act by eliminating or moving the arranged external object.

Furthermore, the object monitoring system 1 according to the present embodiment can convert the area in which the influence degree 32 on the monitoring area exceeds the first threshold value 34, the influence degree 32 thereof, and an external object or a portion thereof identified as the main factor of the influence degree 32 into an image superimposed on the image of the distance measurement value data 11 or the light intensity value data 12 and display the image on the display unit 26. Further, the object monitoring system 1 of the present embodiment includes a second threshold value 35 the set value of which can be easily changed by the user, and like the first threshold value 34, can convert the area in which the influence degree 32 on the monitoring area exceeds the set second threshold value 35, the influence degree 32 thereof, and an external object or a portion thereof identified as the main factor of the influence degree 32 into an image superimposed on the image of the distance measurement value data 11 or the light intensity value data 12 and display the image on the display unit 26. Note that the display of the first threshold value 34 and the display of the second threshold value 35 are distinguished by the font, color, etc. As a result of these functions, the cause of the exceeding of the first threshold value 34 can be easily confirmed. Further, by confirming the display while changing the set value of the second threshold value 35, even in, for example, a situation in which the influence degree 32 does not cause the output of a warning signal, it is possible to confirm the influence degree 32 or to identify external objects having a relatively large influence degree, which enables investigation for improvement purposes.

Further, the object monitoring system 1 according to the present embodiment may comprise means for changing the set value of the first threshold value 34. As a result, at, for example, the time of installation of the object monitoring system 1, when a situation exceeding the first threshold value 34 has already occurred due to an external object that is difficult to eliminate or move such as floors, walls, and existing facilities, in the initially set monitoring area, it is possible to take measures such as reviewing the first threshold value 34 and the monitoring area. Changing of the set value of the first threshold value 34 may be protected by a password lock or the like so that only an installer familiar with the installation status or the required safety of the monitoring area can perform the change.

Figure 2:
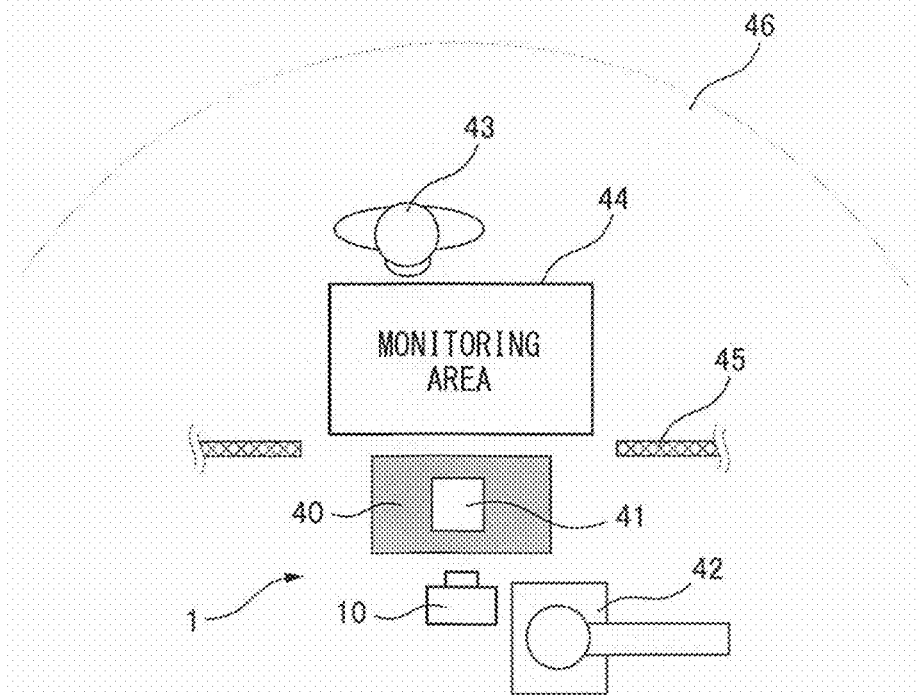
FIG. 2 is a plan view showing an application example of the object monitoring system.

FIG. 2 is a plan view showing an application example of the object monitoring system 1. In the present example, in order to avoid interference between the robot 42, which moves the workpiece 41 arranged on the workbench 40, and the operator 43, the monitoring area 44 is set, and the object monitoring system 1 determines whether or not the operator 43 is present in the monitoring area 44 on a basis of the distance measurement value data of the distance measuring device 10. In the present example, though the monitoring area 44 is defined as a rectangular parallelepiped shape in the vicinity of the opening of a safety fence 45, the monitoring area 44 can be set as an arbitrary shape in an arbitrary location as long as it is within the target space 46 of the distance measuring device 10. The object detection signal output by the object monitoring system 1 is generally used as a signal for interrupting the power of a source of hazard such as the robot or the machine tool, which is isolated from the worker 43, by monitoring the monitoring area 44 in consideration of safety. Conversely, the warning signal output by the object monitoring system 1 can be used as a signal for reducing the output of the source of hazard or for limiting the operation speed in the case of a robot or a machine tool.

Figure 3:
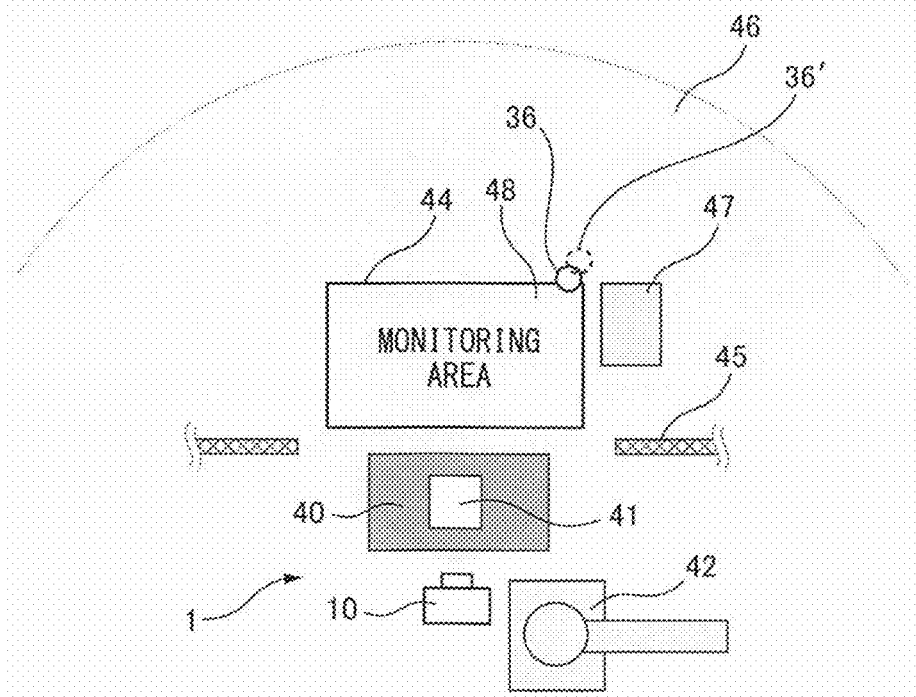
FIG. 3 is a plan view showing an example of an external object which can trigger the multipath phenomenon.

FIG. 3 is a plan view showing an example of an external object 47 which can trigger multipath. The external object 47 is within the target space 46 of the distance measuring device 10, and is defined as an object which is present outside the monitoring area 44. The external object 47 may be a fixed body such as a wall or column, or may be a movable body such as a cardboard box or a chair as shown in FIG. 3.

The distance measurement device 10 performs distance measurement on a basis of the phase difference between the reference light emitted toward the target space 46 and the reflected light from the target space 46 in accordance with the measurement principal, and in the case in which reference light which is multi-reflected via the external object 47 has a strong influence, the distance measurement value may be erroneously large. Thus, as shown in FIG. 3, in particular in the distant position 48 of the monitoring area 44, even in the case in which the actual position 36 of the monitored object is present within the monitoring area 44, the position 36' of the distance measurement value data of the distance measuring device 10 becomes outside the monitoring area 44, whereby it is erroneously determined that the monitored object is not present within the monitoring area 44. Thus, the external object 47 should be excluded, and it is desirable that a warning be issued from the object monitoring system at the time of arrangement.

Figure 4:
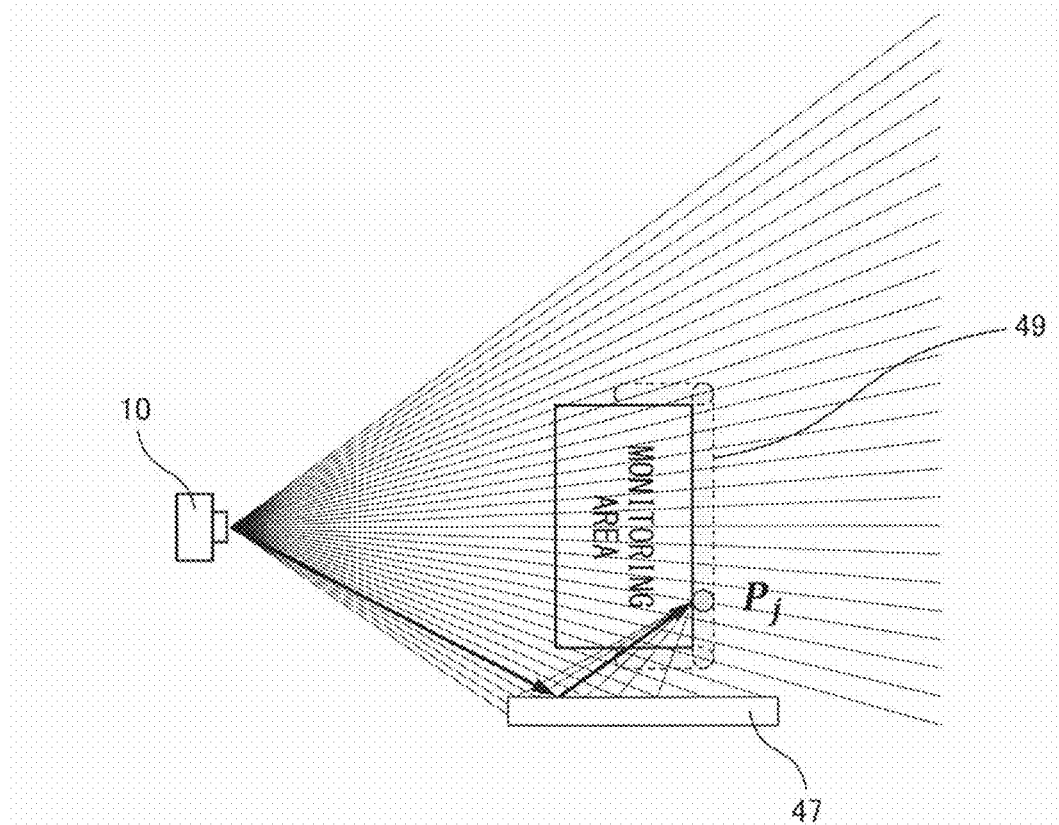
FIG. 4 is a plan view showing the state of reference light reflected by an external object onto the influence confirmation point ($P_j$).

FIG. 4 is a plan view showing the state of the reference light via the external object 47 toward the influence confirmation point $P_j$ (j is an integer). The object monitoring system 1 of the present embodiment determines one or a plurality of influence confirmation points $P_j$ in the far side edge 49 of the monitoring area 44, and calculates the influence degree of the external object 47. In the present example, though the influence confirmation points $P_j$ are defined on the far side edges 49 including the back side, right side and left side of the rectangular monitoring area 44, it should be noted that influence confirmation points $P_j$ can also be defined on the upper and lower surfaces of the monitoring area 44. Due to the nature as a monitoring system, it is common to calculate the influence degree at the influence confirmation point $P_j$ assuming that the object having the greatest influence and specifications such as the size and the reflectivity of the monitored object specified in the object monitoring system 1 is present. Further, it is assumed that the light reflected by the external object 47 is an ideal diffuse reflection, i.e., a Lambert reflection, in which the brightness of the reflective surface is substantially uniform from any angle.

Figure 5:
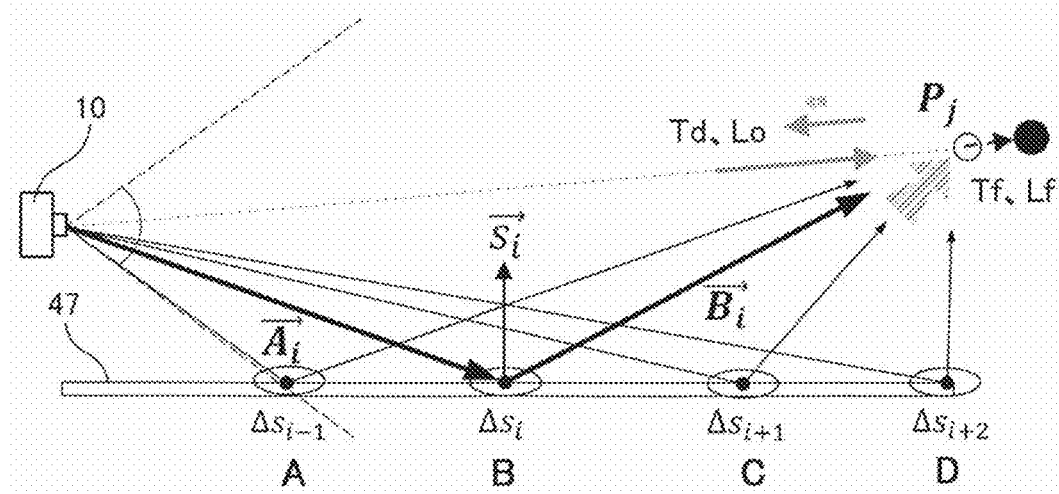
FIG. 5 is a conceptual view showing the principle for calculating the influence degree of an external object in accordance with the arrangement relationship (vector $A_i$, vector $B_i$, and normal vector $s_i$) between the influence confirmation point $P_j$ and the external object.

FIG. 5 is a conceptual view showing the principle for calculating the influence degree of the external object 47 in accordance with the arrangement relationship (vector $A_i$, vector $B_i$, and normal vector $s_i$ (i is an integer) between the object for which the influence confirmation point $P_j$ is assumed and the external object. Vector $A_i$ is the vector linking from the light source of the distance measuring device 10 to the fine surfaces $\Delta s_i$ of the external object 47, and vector $B_i$ is the vector linking from the fine surfaces $\Delta s_i$ of the external object 47 to the influence confirmation point $P_j$. Though FIG. 5 schematically shows four fine surfaces representative of points A to D, it should be noted that light actually reflected from the entire surface of external object 47 illuminates the influence confirmation point $P_j$. Furthermore, normal vector $s_i$, is a vector orthogonal to the fine surfaces $\Delta s_i$ of external object 47.

Since the distance measuring device 10 performs distance measurement on a basis of the time of flight of light, the object distance measurement at influence confirmation point $P_j$ is influenced by not only the single reflected light distance delay $T_d$ directly reflected from influence confirmation point $P_j$, but also by a forward delay Tf of multi-reflected light from influence confirmation point $P_j$ via the external object 47. Thus, the forward delay Tf of the multi-reflected light depends on the sum of the magnitude of vector $A_i$ and the magnitude of vector $B_i$. Furthermore, the object distance measurement at influence confirmation point $P_j$ is influenced by not only the light intensity Lo of single reflected light directly reflected from influence confirmation point $P_j$, but also by the light intensity value Lf of multi-reflected light reflected from the influence confirmation point $P_j$ via the external object 47. When the fine surfaces $\Delta s_i$ of the external object 47 are considered, the reference light of the distance measuring device 10 is strongly emitted toward the fine surfaces $\Delta s_i$ as the normal vector $s_i$ of fine surfaces $\Delta s_i$ more directly face the distance measuring device 10. Furthermore, the influence confirmation point $P_j$ is strongly influenced as the normal vector $s_i$ of the fine surfaces $\Delta s_i$ more directly faces the influence confirmation point $P_j$. In other words, the influence degree from the fine surfaces $\Delta s_i$ of the external object 47 depends on the arrangement relationship (vector $A_i$, vector $B_i$, and normal vector $s_i$) between the influence confirmation point $P_j$ (i.e., the monitoring area), and the fine surfaces $\Delta s_i$ of the external object 47. Thus, in the object monitoring system 1 of the present embodiment, the arrangement relationship between the monitoring area and the external object 47 is determined based on the distance measurement value of the external object 47, and the influence degree of the external object 47 on the object distance measurement within the monitoring area is calculated in accordance with the determined arrangement relationship.

Figure 6A:
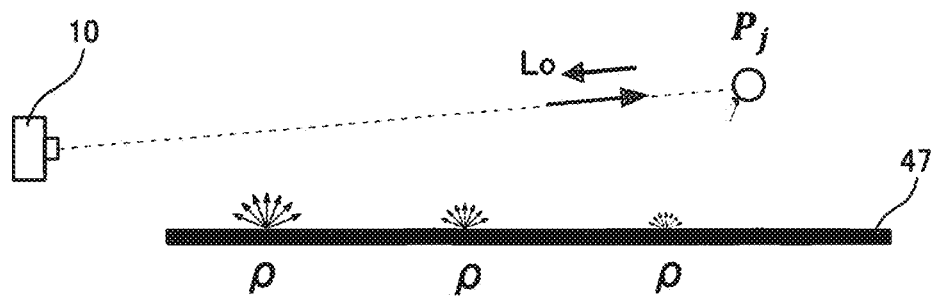
FIG. 6A is a conceptual view showing the principle for calculating the influence degree of the external object in accordance with the reflectivity ($\rho$) of the external object.
Figure 6B:
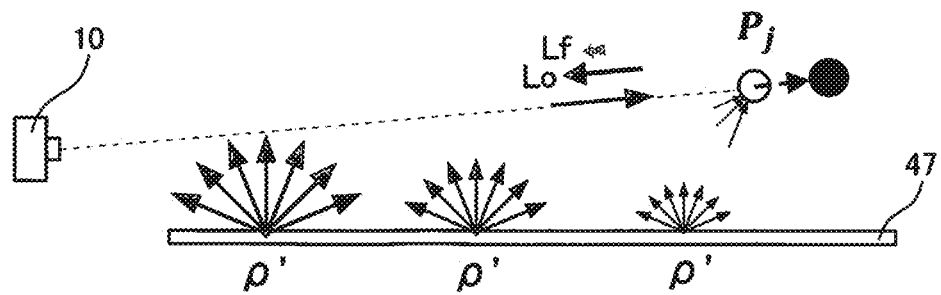
FIG. 6B is a conceptual view showing the principle for calculating the influence degree of the external object in accordance with the reflectivity (ρ') of the external object.

FIGS. 6A and 6B are conceptual views showing the principle for calculating the influence degree of the external object 47 in accordance with the reflectivity (ρ and ρ' (ρ<ρ')) of the external object. A low reflectivity ρ external object 47, such as a black object, is shown in FIG. 6A, and a high reflectivity ρ' external object 47, such as a white object, is shown in FIG. 6B. In the case of a low reflectivity ρ external object 47, the object distance measurement at influence confirmation point $P_j$ is not significantly influenced by the external object 47, but substantially depends on only the light intensity value Lo of the single reflected light directly reflected from the influence confirmation point $P_j$. However, in the case of a high reflectivity ρ' external object 47, the object distance measurement at influence confirmation point $P_j$ depends on the light intensity value Lf of the multi-reflected light reflected from the influence confirmation point $P_1$ via the external object 47 as well. Thus, the object monitoring system 1 of the present embodiment calculates the influence degree based on the reflectivity (ρ and ρ') of the external object 47 estimated from the relationship between the light intensity value and the distance value of the external object 47 as necessary, in addition to the arrangement relationship described above, whereby influence degree calculation accuracy is improved. Theoretical formulas or simplified formulas of the influence degree of the external object 47 will be described below. However, it should be noted that, in consideration of the calculation performance of the computing device 20, these formulas are used after correcting the coefficients on a basis of the verification on an actual machine.

Figure 7:
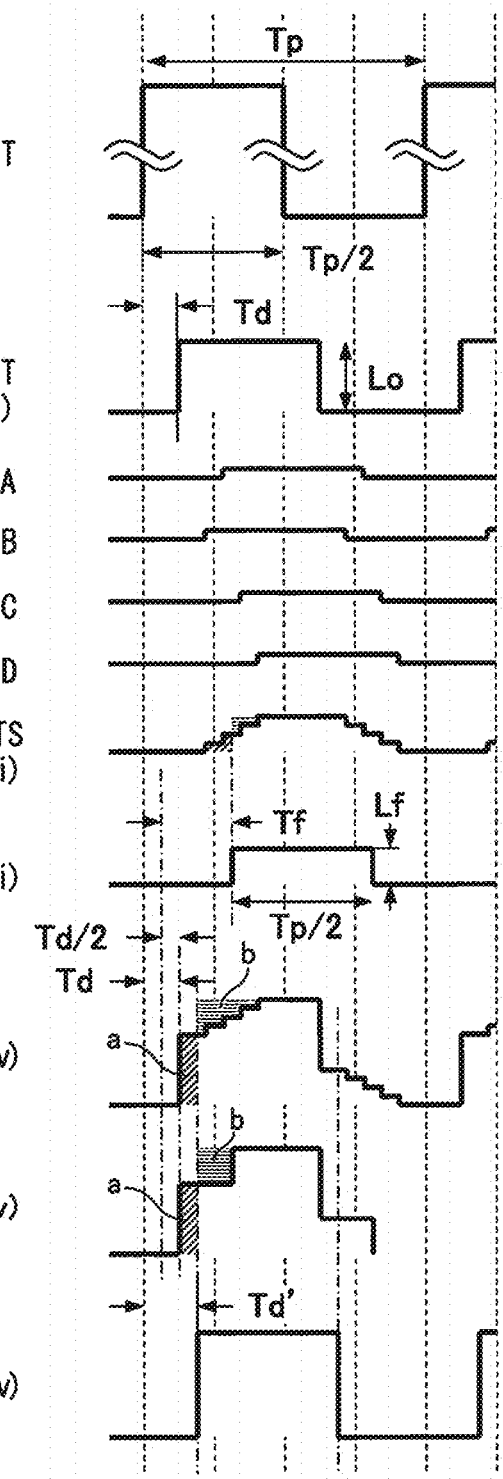
FIG. 7 is a conceptual view detailing a calculating formula of the influence degree of the external object (Td'−Td).

FIG. 7 is a conceptual view detailing a calculating formula of the influence degree of the external object. The graph of FIG. 7 represents a pulse wave of light received by the distance measuring device. The vertical axis of the graph represents light intensity, and the horizontal axis represents time. It is assumed that the reference light is intensity modulated at a period Tp, and the single reflected light (i) directly reflected from the influence confirmation point $P_j$ has a pulse width Tp/2, a light intensity value Lo, and a distance delay Td. In addition to the single reflected light, multi-reflected light (ii) reflected from the influence confirmation point $P_j$ via the external object is reflected by the fine surfaces $\Delta s_i$ of the external object, and is composed of the sum of the reflected light components having delayed phases. The sum of the four reflected light components of points A to D shown in FIG. 5 are representatively shown in FIG. 7. In practice, a distorted composite reflected light (iv) which is a combination of the single reflected light (i) and the multi-reflected light (ii) is received.

When distorted composite reflected light (iv) is received, the distance measuring device 10 performs distance measurement of the light as the rectangular equivalent light (vi) from the distance measurement principle. Even if the multi-reflected light (ii) is considered as rectangular equivalent light (iii) having a forward delay Tf, a light intensity value Lf, and a time width of Tp/2, the influence of the equivalent light (iii) on the actually received distorted composite reflected light (iv) is equivalent as shown in (v) and (vi). At this time, the following formula is obtained from the relationship wherein the areas of the shaded area a and the shaded area b are equal, where t is the time width of the shaded area a.

[Formula 1]

$$t \cdot Lo = (Tf - Td/2 - t) \cdot Lf \qquad 1$$

Further, by converting the above formula, the following formula is obtained.

[Formula 2]

$$t = (Tf - Td/2) \cdot Lf/(Lo + Lf) \qquad 2$$

Since the time width t of the shaded area a is equal to the difference between the distance delay Td' of the equivalent light (vi) of the composite reflected light which is influenced by the external object and the distance delay Td of the single reflected light (i) which is not influenced by the external object, the following formula is obtained.

[Formula 3]

$$Td' - Td = (Tf - Td/2) \cdot Lf/(Lo + Lf) \qquad 3$$

Since the difference Td'−Td is equal to the influence degree of the external object, the influence degree (Td'−Td) of the external object can be calculated from the above formula. In the above formula, the distance delay Td of the single reflected light (i) is determined from the position of the influence confirmation point $P_j$ determined in advance. Furthermore, the light intensity value Lo of the single reflected light (i) can be calculated assuming the most influential reflectivity from the predetermined position of influence confirmation point $P_j$ and the reflectivity of the monitored object designated by the object monitoring system 1. Thus, by determining the light intensity value Lf and the forward delay Tf of the multi-reflected light in the above formula, it is possible to determine the influence degree (Td'−Td) of the external object.

Figure 8:
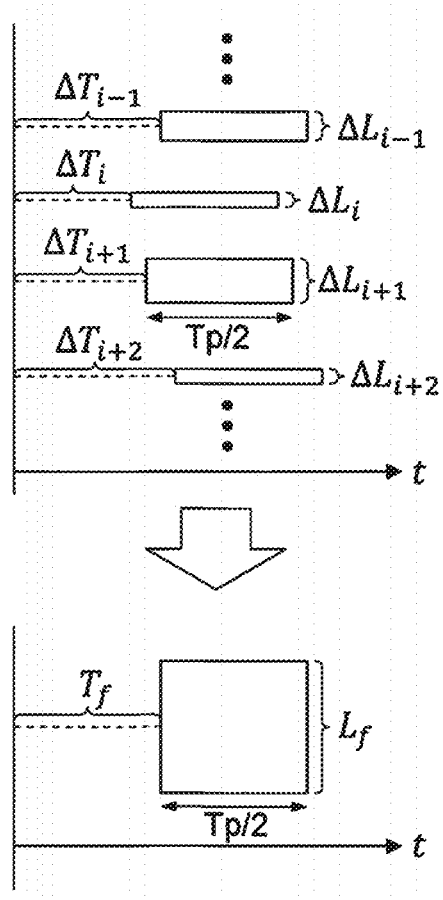
FIG. 8 is a conceptual view detailing a calculating formula of the light intensity value ($L_f$) and the forward delay ($T_f$) of multi-reflected light.

FIG. 8 is a conceptual view detailing the formulas of the light intensity value Lf and the forward delay Tf of the multi-reflected light. It is assumed that the reflected light components from the fine surfaces $\Delta s_i$ of the external object have a pulse width Tp/2, a light intensity $\Delta L_i$, and a forward delay $\Delta T_i$. When these reflected light components are considered as equivalent light having a pulse width Tp/2, a light intensity Lf, and a forward delay Tf, Lf and Tf are as described in the following formulas.

[Formula 4]

$$Lf = \sum \Delta L_i \qquad 4$$

[Formula 5]

$$Tf = \frac{1}{Lf} \sum (\Delta T_i \cdot \Delta L_i) \qquad 5$$

Figure 9:
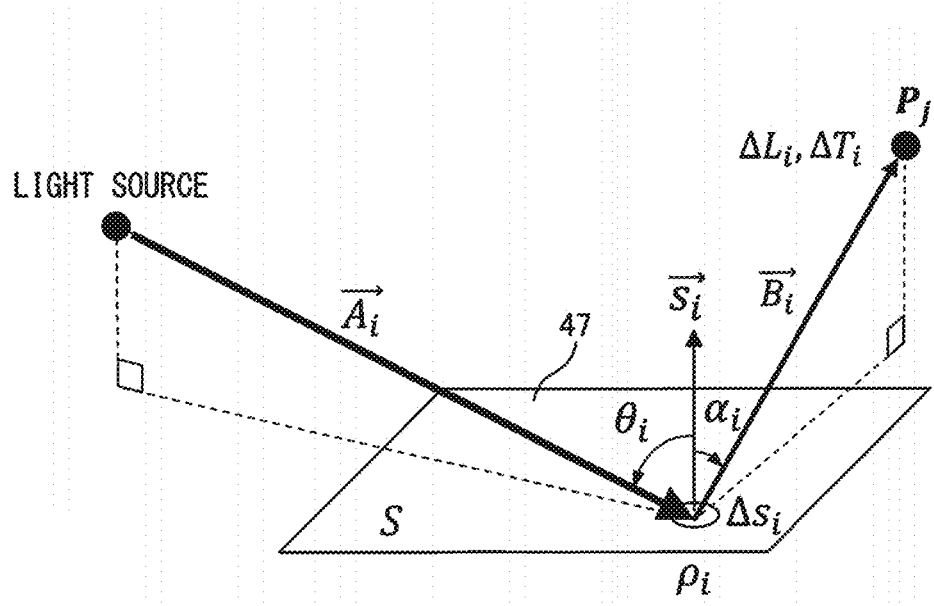
FIG. 9 is a conceptual view detailing a calculating formula of the light intensity value ($\Delta L_i$) and forward delay ($\Delta T_i$) of the reflected light components from the fine surfaces ($\Delta s_i$) of the external object.

$\Delta L_i$ and $\Delta T_i$ of the above formulas will be examined. FIG. 9 is a conceptual view detailing the formulas of the light intensity value $\Delta L_i$ and the forward delay $\Delta T_i$ of the reflected light components from the fine surfaces $\Delta s_i$ of the external object 47. The area of the fine surfaces $\Delta s_i$ of the external object are set as $\Delta s_i$, the reflectivity of each of the fine surfaces is set as $\rho_i$, the angle formed between the vector $A_i$ and the normal vector $s_i$ is set as $\theta_i$, and the angle formed between the vector $B_i$ and the normal vector $s_i$ is set as $\alpha_i$. The light intensity value $\Delta L_i$ of the reflected light components reflected from the influence confirmation point $P_j$ via the fine surfaces $\Delta s_i$ changes in accordance with the reflectivity $\rho_i$, is inversely proportional to the square of the distance, and changes in accordance with the cosines of $\theta_i$ and $\alpha_i$. Furthermore, the forward delay $\Delta T_i$ of the reflected light components reflected from the influence confirmation point $P_j$ via the fine surfaces $\Delta s_i$ is determined from the magnitudes of vector $A_i$ and vector $B_i$, and the speed of light c. Thus, $\Delta L_i$ and $\Delta T_i$ can be determined from the following formulas. k is a proportionality factor.

[Formula 6]

$$\Delta L_i = k \cdot \frac{\rho_i \cdot \cos\theta_i}{|\vec{A_i}|^2} \cdot \frac{\cos\alpha_i}{|\vec{B_i}|^2} \cdot \Delta s_i \qquad 6$$

[Formula 7]

$$\Delta T_i = \frac{1}{c} \cdot (|\vec{A_i}| + |\vec{B_i}|) \qquad 7$$

Thus, the relationship formula of $\Delta T_i \times \Delta L_i$ in formula 5 is as described below from formulas 6 and 7.

[Formula 8]

$$\Delta T_i \cdot \Delta L_i = \frac{k}{c} \cdot \frac{\rho_i \cdot \cos\theta_i \cdot \cos\alpha_i \cdot (|\vec{A_i}| + |\vec{B_i}|)}{|\vec{A_i}|^2 \cdot |\vec{B_i}|^2} \cdot \Delta s_i \qquad 8$$

The normal vector $s_i$ can be estimated using a plurality of pieces of distance information in the vicinity of the fine surfaces $\Delta s_i$ output by the distance measuring device. Thus, if normal vector $s_i$ is obtained, the angle $\theta_i$ formed by vector $A_i$ and the angle $\alpha_i$ formed by vector $B_i$ can also be calculated.

Further, since the fine surfaces $\Delta s_i$ of the external object 47 are detected based on the distance measurement value output by the distance measuring device, the normal vector $s_i$ of the fine surfaces $\Delta s_i$ always faces the distance measuring device. Thus, $0° \leq \theta_i \leq 90°$. Further, fine surfaces $\Delta s_i$ of external object 47 outside the range of $0° < \alpha_i < 90°$ may not be included in the calculation of influence degree since they are surfaces not facing in the direction of influence confirmation point $P_j$.

By substituting formulas 7 and 8 into formulas 4 and 5, the light intensity value Lf and the forward delay Tf of multi-reflected light can be determined from the following formulas.

[Formula 9]

$$Lf = k \sum \frac{\rho_i \cdot \cos\theta_i}{|\vec{A_i}|^2} \cdot \frac{\cos\alpha_i}{|\vec{B_i}|^2} \cdot \Delta s_i \qquad 9$$

[Formula 10]

$$Tf = \frac{k}{c \cdot Lf} \sum \frac{\rho_i \cdot \cos\theta_i \cdot \cos\alpha_i \cdot (|\vec{A_i}| + |\vec{B_i}|)}{|\vec{A_i}|^2 \cdot |\vec{B_i}|^2} \cdot \Delta s_i \qquad 10$$

Since i in formulas 9 and 10 is an integer, these formulas represented the light intensity value Lf and forward delay Tf of multi-reflected light calculated from the discrete values. When formulas 9 and 10 are expressed as the following integral formulas, Lf and Tf are calculated as continuous values. Specifically, the following integral formulas are more precise calculations of the light intensity value Lf and forward delay Tf of multi-reflected light reflected from influence confirmation point $P_j$ through all of the reflection surfaces S of the external object 47. In other words, the influence degree (Td'−Td) of the external object 47 is calculated based on the shape estimated from the distance measurement value of the external object 47. Note that in the following integral formulas, the reflectivity of the reflection surface S is set to a constant value ρs. Further, cos θs, cos αs, vector As, and vector Bs in the following formulas are determined from an arbitrary position on the reflection surface S.

[Formula 11]

$$Lf = k \cdot p_s \int_s \frac{\cos\theta_s}{|\vec{A_s}|^2} \cdot \frac{\cos\alpha_s}{|\vec{B_s}|^2} \cdot ds \qquad 11$$

[Formula 12]

$$Tf = \frac{k \cdot p_s}{c \cdot Lf} \int_s \frac{\cos\theta_s \cdot \cos\alpha_s \cdot (|\vec{A_s}| + |\vec{B_s}|)}{|\vec{A_s}|^2 \cdot |\vec{B_s}|^2} \cdot ds \qquad 12$$

Furthermore, as described above, assuming that the reflection of light by the external object 47 is a Lambert reflection, the following relational formulas hold between the reflectivity $\rho_s$, the light intensity value data $L_s$, and the distance measurement value data $A_s$ (i.e., the magnitude of the vector $A_s$) of the reflection surface S. k is a proportionality factor.

[Formula 13]

$$L_s = \frac{k_s \cdot p_s}{|\vec{A_s}|^2} \qquad 13$$

Thus, by converting formula 13, the reflectance $\rho_s$ of the reflection surface S can be determined from the light intensity value data L and the distance measurement value data $A_i$ of the representative point of the reflective surface S, as described in the formula below.

[Formula 14]

$$\rho_s = \frac{L_i \cdot |\vec{A_i}|^2 \cdot}{k_s} \qquad 14$$

When there are a plurality of reflection surfaces S, i.e., when there are m reflection surfaces (m is an integer of 2 or more), for the individual $Lf_j$ and $Tf_j$ ($1 \leq j \leq m$) determined from formulas 11 and 12, the following formulas can be solved to calculate the influence degree of a plurality of reflection surfaces S.

[Formula 15]

$$Lf = \sum_{j=1}^{m} Lf_j \qquad 15$$

[Formula 16]

$$Tf = \frac{1}{Lf} \sum_{j=1}^{m} (Tf_j \cdot Lf_j) \qquad 16$$

Figure 10:
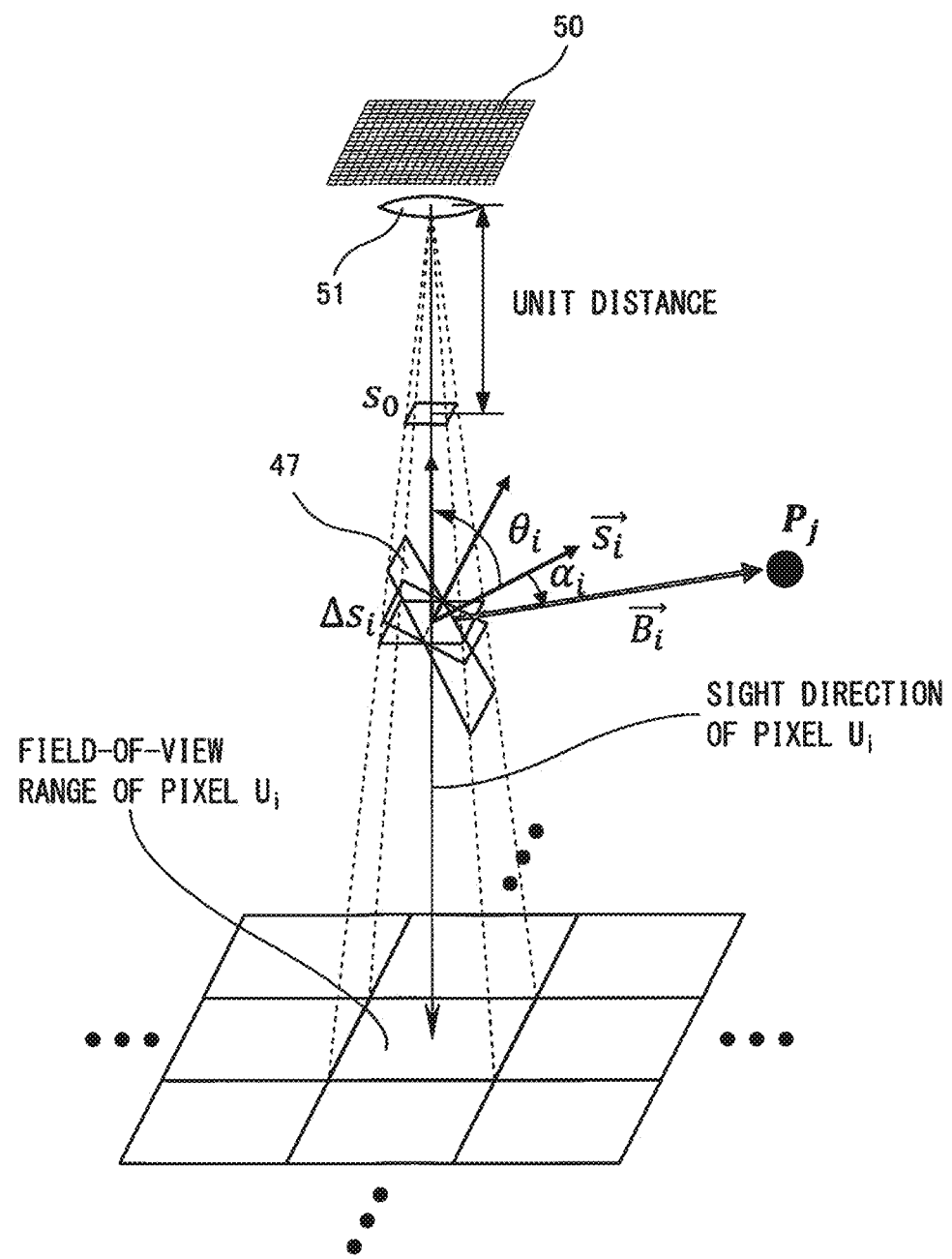
FIG. 10 is a conceptual view showing a simple influence degree calculation method focusing on a pixel unit constituting an image sensor of the distance measuring device.
Figure 11:
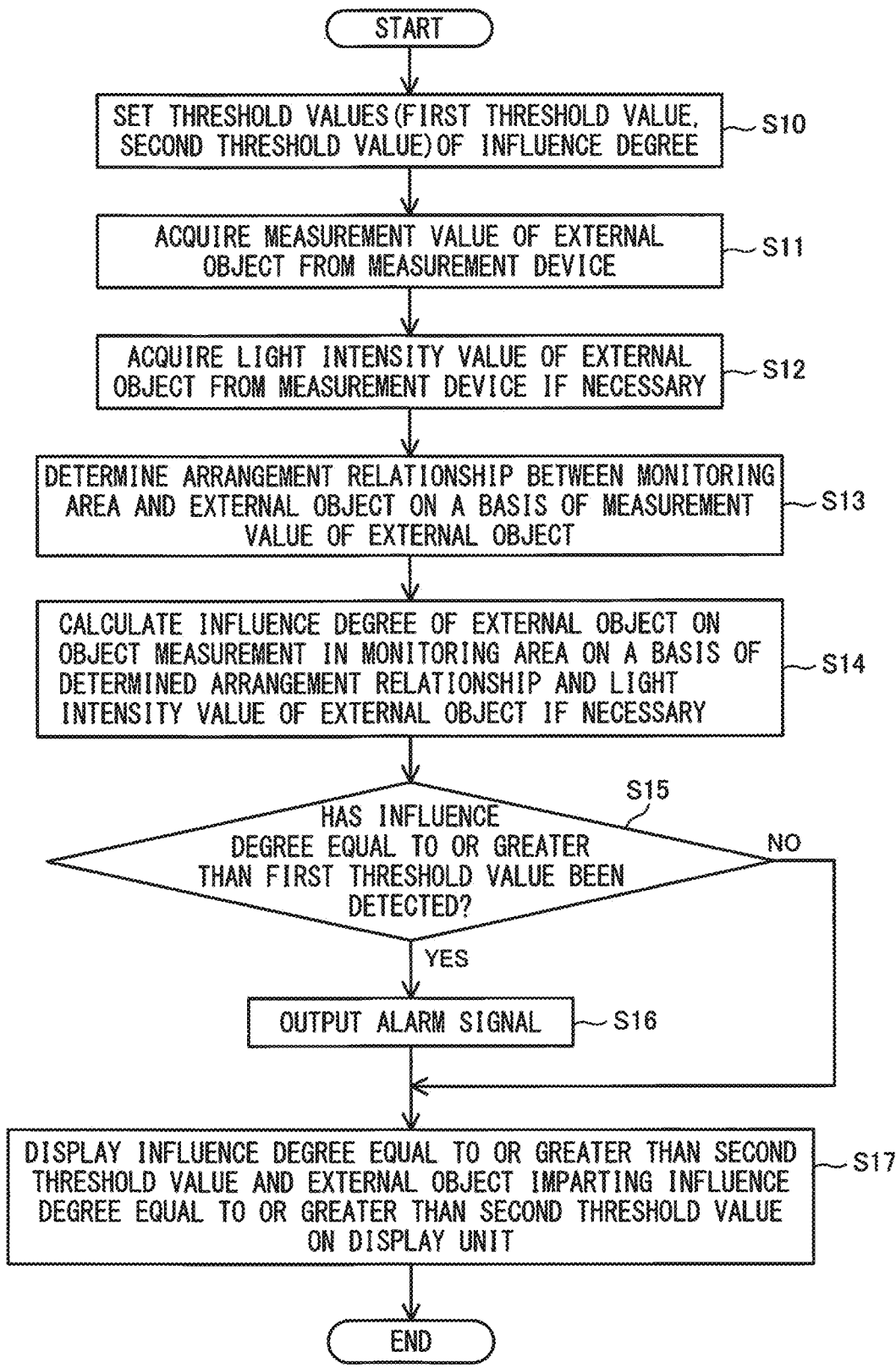
FIG. 11 is a summary flowchart showing the operation of the object monitoring system according to the embodiment.

FIG. 10 is a conceptual view showing a simple method for calculating the influence degree focusing on pixel units constituting the image sensor of the distance measuring device 10. In the following, a simplified calculation method focusing on the pixel units of the image sensor 50 of the distance measuring device will be described in consideration of the calculation performance of the computing device. Each pixel of the image sensor 50 of the distance measuring device has a visual field range associated with the viewing direction. Thus, the above-mentioned fine surfaces $\Delta s_i$ can be considered to correspond to a part of the surface of the external object present in the field-of-view of the pixel $u_i$.

In the case in which the unit area of the plane located at the unit distance from the center of the lens 51 of the distance measuring device and directly facing the image sensor 50 in field-of-view range of each pixel is s0, since the area $\Delta s_i$ of a part of the surface of the external object 47 at the position indicated by the distance measurement value Ai of the arbitrary pixel ui is proportional to the square of the distance and roughly inversely proportional to the cosine of the angle $\theta_i$ with the normal vector $s_i$, the area $\Delta s_i$ can be determined from the following approximate formula. Note that k is a proportionality factor.

[Formula 17]

$$\Delta s_i \cong k \cdot \frac{|\vec{A_i}|^2}{\cos\theta_i} \cdot s_0 \qquad 17$$

Thus, by substituting formula 17 into formulas 9 and 10 and using the new proportionality factor kp, the light intensity value Lf and the forward delay Tf of the multi-reflected light can be determined from the following formulas simplified in units of each pixel constituting the external object 47.

[Formula 18]

$$Lf = k_p \sum \frac{\rho_i \cdot \cos\alpha_i}{|\vec{B_i}|^2} \qquad 18$$

[Formula 19]

$$Tf = \frac{k_p}{c \cdot Lf} \sum \frac{\rho_i \cdot \cos\alpha_i \cdot (|\vec{A_i}| + |\vec{B_i}|)}{|\vec{B_i}|^2} \qquad 19$$

When the distance measuring device 10 cannot output the light intensity value data, or if the reflectance $\rho_i$ is a constant value and the new proportionality coefficient $k_{p1}$ is used in formula 18 and 19 as a method of simplifying the formula, the light intensity value Lf and forward delay Tf of the multi-reflected light can also be determined from the following simplified formulas.

[Formula 20]

$$Lf = k_{p1} \sum \frac{\cos\alpha_i}{|\vec{B_i}|^2} \qquad 20$$

[Formula 21]

$$Tf = \frac{k_{p1}}{c \cdot Lf} \sum \frac{\cos\alpha_i \cdot (|\vec{A_i}| + |\vec{B_i}|)}{|\vec{B_i}|^2} \qquad 21$$

Formulas 20 and 21 represent methods for calculating the influence degree of the external object using only the distance measurement value of each pixel output by the distance measuring device. The proportional coefficient $k_{p1}$ is practically determined based on actual measurement.

As described above, assuming that the reflection of light by the external object 47 is a Lambert reflection, the light intensity value $I_i$ of each pixel reflects the reflectivity of a part of the surface of the external object 47 corresponding to each pixel. Thus, by substituting formula 14 into formulas 18 and 19 and using the new proportionality factor $k_{p2}$, the following formulas are obtained.

[Formula 22]

$$Lf = k_{p2} \sum \frac{I_i \cdot |\vec{A_i}|^2 \cdot \cos\alpha_i}{|\vec{B_i}|^2} \qquad 22$$

[Formula 23]

$$Tf = \frac{k_{p2}}{c \cdot Lf} \sum \frac{I_i \cdot |\vec{A_i}|^2 \cdot \cos\alpha_i \cdot (|\vec{A_i}| + |\vec{B_i}|)}{|\vec{B_i}|^2} \qquad 23$$

Formulas 22 and 23 represent methods for calculating the influence degree of the external object using the light intensity value of each pixel output by the distance measuring device as well, with respect to formulas 20 and 21. As a result, the influence of the reflectivity of the external object can be taken into consideration, thereby improving the accuracy of the influence degree calculation. The proportional coefficient $k_{p2}$ is practically determined based on actual measurement. Furthermore, the normal vector $s_i$ is obtained from the distance measurement values of a plurality of pixels adjacent to the target pixel $u_i$. Furthermore, cos $\alpha_i$ may be set to 1 as the maximum value in order to further simplify the formulas.

The operation of the object monitoring system according to the present embodiment will be described below with reference to the summary flowchart of FIG. 1. The following steps may be executed by the object monitoring program shown in FIG. 1. First, in step S10, threshold values (first threshold value, second threshold value) of the influence degree are set in advance as necessary. In step S11, the distance measurement value of the external object is acquired from the distance measuring device. In step S12, the light intensity value of the external object is acquired from the distance measuring device as necessary. In step S13, the arrangement relationship (vector $A_i$, vector $B_i$, and normal vector $s_i$) between the monitoring area and the external object is determined based on the distance measurement value of the external object. In step S14, the influence degree (Td'−Td) of the external object on the object distance measurement within the monitoring area is calculated based on the determined arrangement relationship and the acquired light intensity value ($I_i$) of the external object if necessary. As a result, the influence degree of the external object on the object distance measurement within the monitoring area can be recognized.

In step S15, it is determined whether or not an influence degree equal to or greater than the first threshold value has been detected. When an influence degree equal to or greater than the first threshold value has been detected (Yes in step S15), a warning signal is output in step S16 using the signal output unit. By issuing an alarm via the warning signal, it can be confirmed whether or not an external object exerting influence on the object distance measurement within the monitoring area is present.

In step 17, an influence degree equal to or greater than the second threshold value and the external object imparting the influence degree which is equal to or greater than the second threshold value are displayed on the display unit as necessary. As a result, the position of the external object and the influence degree thereof can be visually confirmed. Furthermore, when a change in the position of the external object or a change in the monitoring area occurs, the effect of this change on the influence degree of the external object can be visually confirmed. By making the set value of the second threshold value easily changeable by the user, even in a situation in which there is an influence degree for which a warning signal is not output, it is possible to confirm the influence degree or identify the external object having a relatively high influence degree, which enables investigation for improvement purposes.

FIG. 12 is a view showing an example of a display screen 52 on which influence degrees (+23 mm, +65 mm) equal to or greater than the second threshold value and an external object 47 imparting such influence degree greater than or equal to the second threshold value are displayed. The influence degree (+23 mm, +65 mm) which is greater than or equal to the second threshold value for each of influence confirmation points $P_j$ and $P_j+1$ on the far side edge of the monitoring area 44 is displayed on the display screen 52. It is desirable that the external object 47 which imparts the influence degree which is greater than or equal to the second threshold value be displayed on the display screen 52 having a color different from other objects. The influence degree and external object 47 are displayed and superimposed on the distance image, the light intensity image, or the color image output by the distance measuring device. When a change in the arrangement of the external object or a change in the monitoring area occurs, the effect of these changes on the influence degree of the external object can be visually confirmed.

The program for executing the above-described flowchart may be provided by being recorded on a computer readable non-transitory recording medium such as a CD-ROM.

Though various embodiments have been described in the present description, the present invention is not limited to the embodiments described above. It can be recognized that various modifications can be made within the scope of the following claims.

The invention claimed is:

1. An object monitoring system, comprising:
   a distance measuring device configured to measure and output a distance measurement value of a target space on a basis of a phase difference between reference light emitted toward the target space and reflected light reflected from the target space, for determining, based on the distance measurement value, whether or not a monitored object is present in a set monitoring area in the target space; and
   a processor configured to
      determine an arrangement relationship between (i) an influence confirmation point located along a far side edge of the monitoring area and outside the monitoring area and (ii) an external object outside the monitoring area on a basis of the distance measurement value of the external object, and
      calculate an influence degree of the external object on an object distance measurement of the influence confirmation point in the monitoring area in accordance with the determined arrangement relationship.

2. The object monitoring system according to claim 1, wherein
   the distance measuring device is further configured to measure and output a light intensity value of the target space, and
   the processor is further configured to calculate the influence degree from the light intensity value of the external object in addition to the arrangement relationship.

3. The object monitoring system according to claim 2, wherein the processor is configured to calculate the influence degree based on a shape estimated from the distance measurement value of the external object and a reflectivity estimated from the light intensity value of the external object.

4. The object monitoring system according to claim 1, wherein the processor is further configured to cause a warning signal to be output in response to detecting an influence degree which is not less than a first threshold value.

5. The object monitoring system according to claim 4, further comprising a display, wherein the processor is further configured to cause the display to display an influence degree which is not less than a second threshold value and the external object imparting the influence degree which is not less than the second threshold value.

6. The object monitoring system according to claim 5, wherein the processor is further configured to change a set value of at least one of the first threshold value and the second threshold value.

7. The object monitoring system according to claim 1, wherein at least one further influence confirmation point is defined on at least one of 1) an upper surface of the monitoring area or 2) a lower surface of the monitoring area.

* * * * *